(12) United States Patent
Shimanaka

(10) Patent No.: US 6,198,546 B1
(45) Date of Patent: Mar. 6, 2001

(54) IMAGE PROCESSING DEVICE

(75) Inventor: Masaya Shimanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/021,591

(22) Filed: Feb. 10, 1998

(30) Foreign Application Priority Data

Feb. 10, 1997 (JP) .................................................. 9-025702

(51) Int. Cl.⁷ ............................ H04N 1/024; H04N 1/40; H04N 1/04
(52) U.S. Cl. ............................ 358/473; 358/486; 358/445
(58) Field of Search .................................. 358/473, 486, 358/445, 448; 382/313, 318

(56) References Cited

U.S. PATENT DOCUMENTS

| 4,947,267 | * | 8/1990 | Masaki et al. | 358/426 |
| 5,305,122 | * | 4/1994 | Hayashi et al. | 358/530 |
| 5,530,562 | * | 6/1996 | Eisenbarth et al. | 358/496 |
| 5,687,003 | * | 11/1997 | Nagano | 358/455 |
| 5,809,175 | * | 9/1998 | Kondo | 382/237 |

FOREIGN PATENT DOCUMENTS

| 54-159810 | 12/1979 | (JP) . |
| 56-125158 | 10/1981 | (JP) . |
| 60-219865 | 11/1985 | (JP) . |
| 61-131164 | 8/1986 | (JP) . |
| 62-161252 | 7/1987 | (JP) . |
| 63-59160 | 3/1988 | (JP) . |
| 5-114996 | 5/1993 | (JP) . |
| 6-291936 | 10/1994 | (JP) . |

OTHER PUBLICATIONS

Japanese Office Action issued Nov. 2, 1999 in a related application and English translation of relevant portions.

* cited by examiner

Primary Examiner—Cheukfan Lee
(74) Attorney, Agent, or Firm—Ostrolenk, Faber, Gerb & Soffen, LLP

(57) ABSTRACT

An image processing device comprises an image reader section, an A/D converter section, a speed detection roller, an encoder, and an image information precision control section. The image reader section detects the intensity of one or more colors on a subject on which the image reader section moves, and outputs an electrical signal corresponding to the intensity. The A/D converter section quantizes the electric signal to a digital signal. The movement speed of the image reader section which is moving on the subject is detected by the speed detection roller and the encoder. The image information precision control section controls quantization precision of the digital signal according to the movement speed detected by the speed detection roller and the encoder. According to the image processing device, the amount of data which is outputted to an external device such as a personal computer via an interface is automatically limited adequately according to the movement speed, thereby precise and relatively high quality images can be obtained constantly regardless of the movement speed, without causing image contraction, disappearance of pixel image information, or wrong colors.

17 Claims, 3 Drawing Sheets

IMAGE PROCESSING DEVICE

BACKGROUND OF THE INVENTION

The present invention relates to an image processing device, and in particular, to an image processing device in which image information of the subject is inputted according to movement of the device along the surface the subject.

Description of the Related Art

These days, hand-held image scanners are widely used for inputting image information on subjects such as text on books etc. When such a hand-held image scanner is used for inputting image information, the scanner is placed on the subject and is needed to be moved manually in vertical scanning direction with respect to the subject such as a document. However, if the speed of the manual movement is too fast, image processing speed of the hand-held image scanner can not follow the input speed of the image information, and thus problems such as image contraction occurs.

In order to prevent such problems, some hand-held image scanners are designed to display the movement speed and let the operator recognize overspeed, or some hand-held image scanners are designed to make a warning beep when the movement speed is higher than a threshold speed, thereby operators can control the manual movement speed adequately.

However, with such conventional hand-held image scanners, the operator himself/herself has to judge the movement speed by seeing the display or by hearing the warning beep and control the movement speed. Here, response time needed for an operator to reduce the movement speed after hearing the warning beep etc. varies among individuals, and thus some operators may continue moving the hand-held image scanner at a movement speed higher than readable movement speed for a while, causing the image contraction, etc.

Meanwhile, in some image reading devices, the amount of image information to be processed by the device is reduced by curtailing or thinning out the amount of image information transferred therein, thereby the maximum image information input speed is raised, and problems such as image contraction are avoided. Such image reading devices are disclosed in Japanese Patent Application Laid-Open No.HEI6-291936 and in Japanese Patent Application Laid-Open No.HEI5-114996, for example.

FIG. 1 is a timing chart showing the 'curtailing' operation of an image reading device which is disclosed in Japanese Patent Application Laid-Open No.HEI5-114996. In FIG. 1, 'HSYNC' is a synchronous signal for a CCD image sensor. The period of the synchronous signal HSYNC is set at 4 ms, for example. The 'CCDOUT' is output from the CCD image sensor whose resolution in horizontal scanning direction is 300 DPI (Dots Per Inch). In this case, the width of one pixel on the subject is approximately 84.7 $\mu$m (2.54 cm/300), and pixel numbers (1, 2, 3, 4, 5) are shown in FIG. 1. 'PMCK' is a clock signal for driving a stepping motor. Here, 4 pulses of the clock signal PMCK is included in the aforementioned 4 ms, therefore the stepping motor is driven at a clock frequency of 1000 PPS (Pulse Per Second). The clock frequency 1000 PPS corresponds to the aforementioned resolution 300 DPI, since 4 pulses of the clock signal PMCK correspond to one pixel.

When 'curtailing' is not executed, image information of every pixel on the subject (1, 2, 3, 4, . . . ) is read by the image reading device. In this case, the intensity of white of each pixel detected by the CCD image sensor is quantized by a 6-bit A/D converter and the quantized 6-bit value (0–65 in decimal digits) of every pixel is transferred to an external device such as a personal computer via an interface circuit of the image reading device.

When 'curtailing' is executed in the curtailing mode #1 in FIG. 1, image information of every other pixel on the subject (1, 3, 5, . . . ) is read by the image reading device. In this case, the intensity of white of every other pixel detected by the CCD image sensor is quantized by the same 6-bit A/D converter and the quantized 6-bit value of every other pixel is transferred to the external device via the interface circuit.

When 'curtailing' is executed in the curtailing mode #2 in FIG. 1, image information of each pixel whose pixel number is a multiple of 4 (4, 8, . . . ) is read by the image reading device. In this case, the intensity of white of each pixel whose pixel number is a multiple of 4 is quantized by the same 6-bit A/D converter and the quantized 6-bit values of the pixels are transferred to the external device via the interface circuit.

However, with such curtailing or thinning out of the transferred image information (i.e. pixel skipping), image information of some pixels has to disappear completely, and thus the quality of the image is necessarily deteriorated.

Further, in the case of color image reading, a sequence of three pixels is used for acquiring the intensity of three primary colors (Red, Green, Blue), that is, a pixel for acquiring the intensity of red, a pixel for acquiring the intensity of green, and a pixel for acquiring the intensity of blue are arranged in a row, and the sequence of three pixels for acquiring the intensity of RGB primary colors is repeated along each line in the horizontal scanning direction. In such a case, the curtailing (pixel skipping) method is disadvantageous, since inconsistencies in color (wrong colors) occur due to the pixel skipping.

SUMMARY OF THE INVENTION

It is therefore the primary object of the present invention to provide an image processing device by which precise and high quality images can be obtained constantly regardless of the movement speed of the device on the subject, without causing image contraction, disappearance of pixel image information, or wrong colors.

In accordance with the present invention, there is provided an image processing device comprising an image reader means, a quantization means, a speed detection means, and a quantization precision control means. The image reader means detects the intensity of one or more colors on a subject on which the image reader means moves, and outputs an electric signal corresponding to the intensity. The quantization means quantizes the electrical signal to a digital signal. The speed detection means detects the movement speed of the image reader means which is moving on the subject. And the quantization precision control means controls quantization precision of the digital signal according to the movement speed detected by the speed detection means.

In accordance with one aspect of the present invention, the speed detection means includes a speed detection roller whereby the movement speed of the image reader means on the subject is detected by rotation of the speed detection roller.

In accordance with another aspect of the present invention, the quantization precision control means sets the quantization precision at the highest precision of the quantization means when the movement speed detected by the speed detection means is lower than a threshold value, and the quantization precision control means sets the quantization precision at precision which is lower than the highest precision of the quantization means when the movement speed detected by the speed detection means is not lower than the threshold value.

In accordance with another aspect of the present invention, the quantization precision control means classifies the movement speed detected by the speed detection means into three or more levels using two or more threshold values, and sets the quantization precision according to the classified level so that the quantization precision will get higher as the level gets lower.

In accordance with another aspect of the present invention, the quantization precision control means outputs the most significant n bits of the digital signal with which the quantization precision control means is supplied, when the quantization precision control means sets the quantization precision at n-bits.

In accordance with another aspect of the present invention, the quantization precision control means outputs a precision change signal when the quantization precision control means varies the quantization precision.

In accordance with another aspect of the present invention, the image reader means executes black-and-white image reading and detects the intensity of white on the subject.

In accordance with another aspect of the present invention, the image reader means executes color image reading and detects the intensity of red, green and blue of corresponding pixels on the subject.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
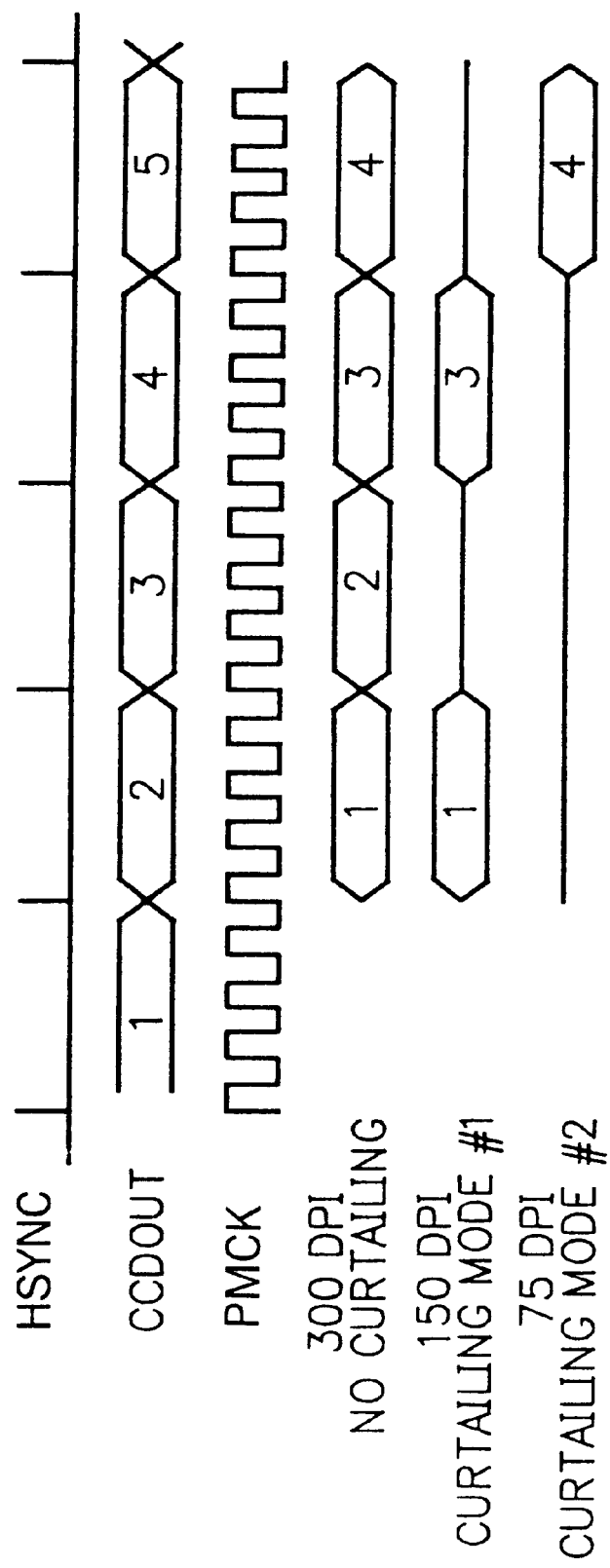
FIG. 1 is a timing chart showing a 'curtailing' operation of an image reading device which is disclosed in Japanese Patent Application Laid-Open No.HEI5-114996.

Referring now to the drawings, a description will be given in detail of preferred embodiments in accordance with the present invention.

Figure 2:
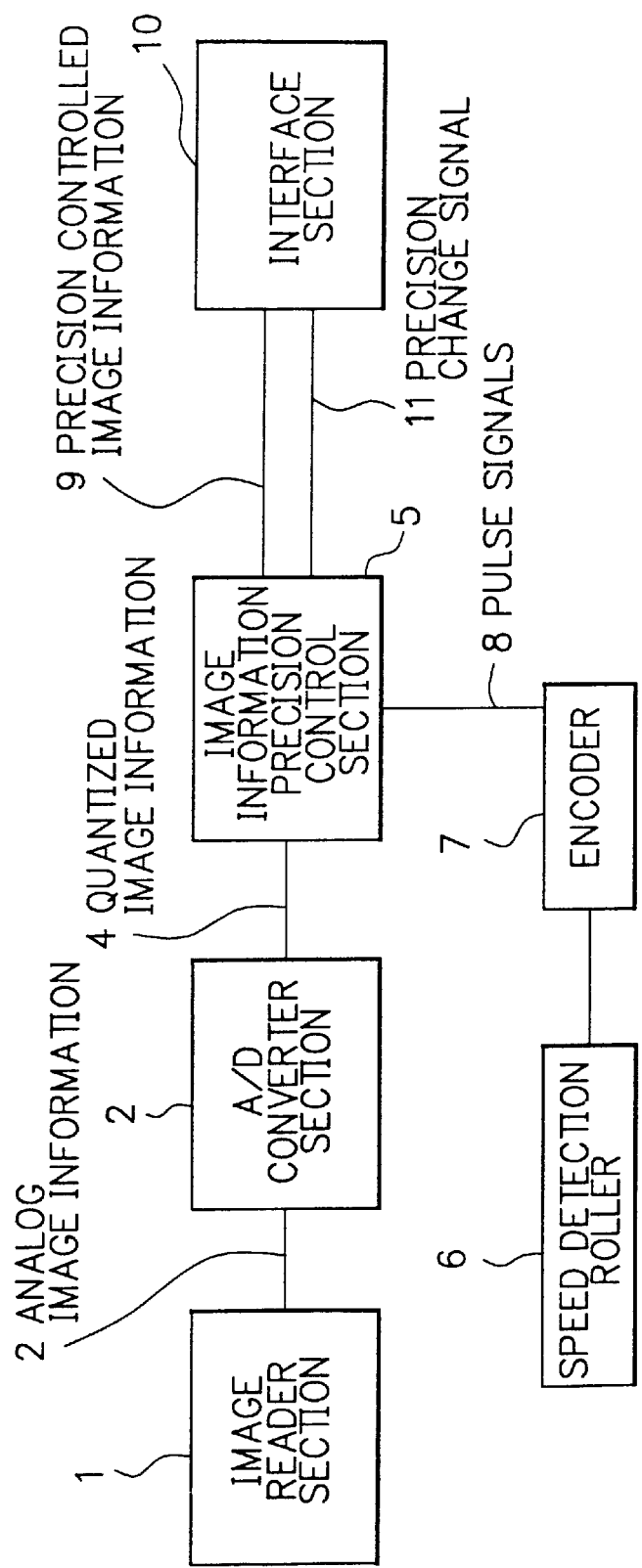
FIG. 2 is a block diagram showing an image processing device according to an embodiment of the present invention.

FIG. 2 is a block diagram showing an image processing device such as a hand-held image scanner according to an embodiment of the present invention. The image processing device comprises an image reader section 1, an A/D converter section 3, an image information precision control section 5, a speed detection roller 6, an encoder 7, and an interface section 10. The above elements shown in FIG. 2 other than the interface section 10 are contained in one body. However, it is also possible that only the image reader section 1, the speed detection roller 6 and the encoder 7 are contained in an independent unit which moves on the subject.

The image reader section 1 is composed of a CCD image sensor whose resolution in the horizontal scanning direction is 300 DPI, for example. In this case, the width of one pixel on the subject in the horizontal scanning direction is approximately 84.7 $\mu$m (2.54 cm/300). The image reader section 1 detects the intensity of white of each pixel and outputs the intensity of each pixel to the A/D converter section 3 as analog image information 2.

The A/D converter section 3 quantizes the intensity of white of each pixel into an 8-bit value and outputs the 8-bit value to the image information precision control section 5 as quantized image information 4. Incidentally, the aforementioned '8-bit value' is only an example, and the A/D converter section 3 is not limited to an 8-bit A/D converter.

The speed detection roller 6 detects the speed of the image processing device which moves on the subject in the vertical scanning direction, by rotation of itself. The encoder 7 generates pulse signals 8 according to the rotation of the speed detection roller 6 (i.e. according to the movement of the image processing device on the subject in the vertical scanning direction) and outputs the pulse signals 8 to the image information precision control section 5. The image information precision control section 5 controls and varies the quantization precision of the quantized image information 4 according to the frequency of the pulse signals 8 and outputs the precision controlled image information 9 to the interface section 10. The precision controlled image information 9 is outputted to an external device such as a personal computer via the interface section 10. When the quantization precision of the quantized image information 4 is varied by the image information precision control section 5 a precision change signal 11 is outputted by the image information precision control section 5 to the interface section 10, and the precision change signal 11 is outputted to an external device via the interface section 10.

The control of the quantization precision by the image information precision control section 5 can be executed by the following method, for example.

In the case where the quantized image information 4 of a pixel supplied by the A/D converter section 3 to the image information precision control section 5 is '10110111' and the image information precision control section 5 sets the quantization precision at 8-bits, every bit of the quantized image information 4 (i.e. '10110111') is outputted to the interface section 10 as the precision controlled image information 9.

In the case where the quantized image information 4 supplied to the image information precision control section 5 is '00100101' and the image information precision control section 5 varies the quantization precision to 6-bits, the image information precision control section 5 outputs a precision change signal 11 (for example, '10') to the interface section 10, and outputs the most significant six bits of the quantized image information 4 (i.e. '001001') to the interface section 10 as the precision controlled image information 9.

In the case where the quantized image information 4 supplied to the image information precision control section 5 is '01001001' and the image information precision control section 5 varies the quantization precision to 4-bits, the image information precision control section 5 outputs a precision change signal 11 (for example, '01') to the interface section 10, and outputs the most significant four bits of the quantized image information 4 (i.e. '0100') to the interface section 10 as the precision controlled image information 9.

In the case where the quantized image information 4 supplied to the image information precision control section 5 is '01011010' and the image information precision control section 5 varies the quantization precision to 8-bits, the image information precision control section 5 outputs a precision change signal 11 (for example, '11') to the interface section 10, and outputs every bit of the quantized image information 4 (i.e. '01011010') to the interface section 10 as the precision controlled image information 9.

Here, the speed detection by the speed detection roller 6 is executed according to the movement of the image processing device on the subject in the vertical scanning direction, whereas the detection of the intensity of white of a line of pixels (which are arranged in the horizontal scanning direction) is executed by the image reader section 1 within a very short time which is shorter than a time needed for the image processing device to move the length of a pixel in the vertical scanning direction. Therefore, it is preferable that the change of the quantization precision by the image information precision control section 5 is executed in units of the horizontal scanning, that is, the aforementioned precision change signal 11 is outputted by the image information precision control section 5 after a precision controlled image information 9 corresponding to the last pixel in the line in the horizontal scanning direction is outputted (i.e. before a precision controlled image information 9 corresponding to the first pixel in the next line is outputted). However, needless to say, change of the quantization precision is not limited to such timing and may as well be executed according to other timing.

Figure 3:
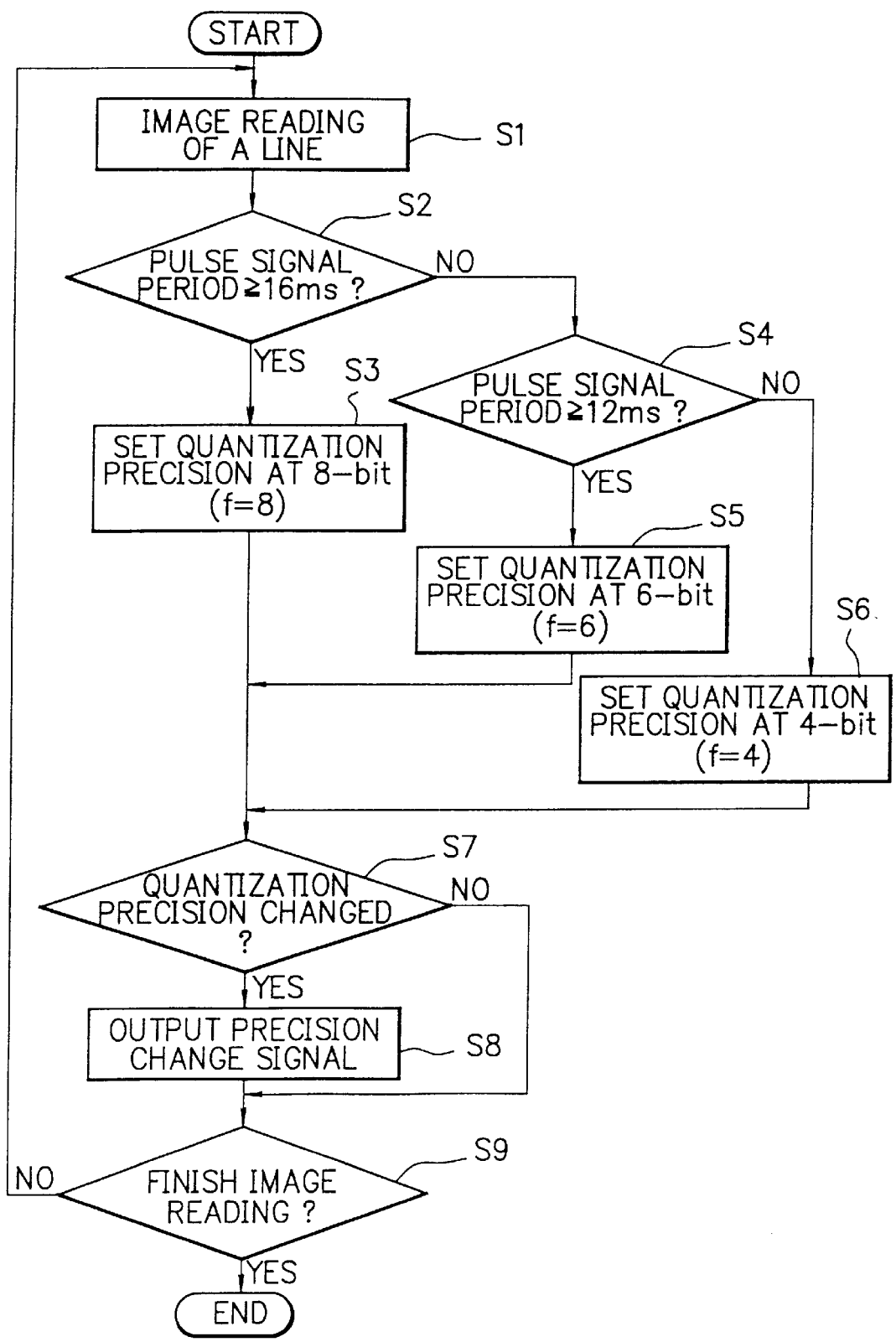
FIG. 3 is a flow chart showing the operation of the image processing device of FIG. 2.

In the following, the operation of the image processing device of FIG. 2 will be described in detail referring to FIG. 3, mainly on the operation of the image information precision control section 5. In the flow chart of FIG. 3, the speed detection by the speed detection roller 6 is executed once during one horizontal scan, and the change of the quantization precision is executed according to the aforementioned timing (in units of horizontal scanning), for example. Incidentally, the flow shown in FIG. 3 is only a simple example, and modification of the flow is of course possible.

In step S1, the image reader section 1 detects the intensity of white of each pixel on a line in the horizontal scanning direction, and outputs the analog image information 2 corresponding to each pixel to the A/D converter section 3 one after another. The A/D converter section 3 quantizes the intensity of white of each pixel on the line into 8-bit values and outputs the 8-bit quantized image information 4 corresponding to each pixel to the image information precision control section 5 one after another. The image information precision control section 5 limits the number of bits of the 8-bit quantized image information 4 to f-bits (f: the current number of bits), and outputs the precision controlled image information 9 corresponding to each pixel on the line to the interface section 10. The precision controlled image information 9 corresponding to each pixel on the line is sent to the external device such as a personal computer one after another via the interface section 10.

In step S2, the image information precision control section 5 which receives the pulse signals 8 from the encoder 7 checks whether or not the period of the rotation of the speed detection roller 6 is 16 ms or longer. Here, the faster the movement speed of the image processing device becomes, the shorter the period of the rotation of the speed detection roller 6 becomes. Incidentally, the aforementioned threshold value '16 ms' or '12 ms' is only an example, and appropriate threshold values should be set according to factors such as the diameter of the speed detection roller 6, the maximum processing speed of the interface section 10, etc. If the period is 16 ms or longer in step S2 (YES), the image information precision control section 5 sets the quantization precision (the current number of bits f) of the next line at 8-bits (the maximum quantization precision) in step S3 and the process proceeds to step S7.

If the period is shorter than 16 ms in step S2 (NO), the process proceeds to step S4 and the image information precision control section 5 checks whether or not the period of the rotation of the speed detection roller 6 is 12 ms or longer using the pulse signals 8 supplied from the encoder 7.

If the period is 12 ms or longer in step S4 (YES), the image information precision control section 5 sets the quantization precision (the current number of bits f) of the next line at 6-bits in step S5, and the process proceeds to step S7.

If the period is shorter than 12 ms in step S4 (NO), the process proceeds to step S6 and the image information precision control section 5 sets the quantization precision (the current number of bits f) of the next line at 4-bits, and the process proceeds to step S7.

In step S7, the image information precision control section 5 checks whether or not the quantization precision (the current number of bits f) has changed from the previous value. If the quantization precision has changed (YES), the precision change signal 11 is outputted by the image information precision control section 5 to the external device via the interface section 10 (step S8) and the process proceeds to step S9. The precision change signal 11 may be a 2-bit signal ('01' representing change to 4-bits, '10' representing change to 6-bits, or '11' representing change to 8-bits) as mentioned above, for example. However, needless to say, it is as well possible to use other types of precision change signal 11 than the 2-bit signal. If the quantization precision has not changed (NO) in the step S7, the precision change signal 11 is not outputted by the image information precision control section 5 and the process proceeds to step S9.

In step S9, it is determined whether or not image reading by the image processing device should be finished, by referring to the pulse signals 8 from the encoder 7, for example. If the determination in the step S9 is 'NO', process is returned to the step S1 and the image reading process for the next line is executed using the current number of bits f for the next line which has been determined in the steps S2 through S6. If the determination in the step S9 is 'YES', the image reading process by the image processing device is finished.

Incidentally, although the image reader section 1 in the embodiment described above executed black-and-white image reading and detected the intensity of white of each pixel on a line, the present invention can be applied to an image processing device including an image reader section for executing color image reading. In order to execute color image reading, the image reader section may be composed of three types of sensor elements, i.e. sensor elements for detecting the intensity of red of a pixel (red elements), sensor elements for detecting the intensity of green of a pixel (green elements), and sensor elements for detecting the intensity of blue of a pixel (blue elements). For example, a unit composed of a red element, a green element and a blue element aligned in a row may be repeated in the horizontal scanning direction in the image reader section. In such an image processing device including the image reader section for executing color image reading, the quantization precision control according to the present invention can be executed similarly and similar effects can be obtained.

As described above, according to the embodiment, the movement speed of the image processing device is detected by the speed detection roller 6 and the encoder 7, and the quantization precision of the quantized image information 4 is automatically controlled and limited by the image information precision control section 5 according to the movement speed, and the precision controlled image information 9 is outputted to external devices via the interface section 10. Therefore, the amount of data which should be outputted to the external device via the interface section 10 is automatically and adequately limited according to the movement speed of the image processing device without speed control by the operator, thereby the aforementioned 'image contraction' problem of the conventional hand-held image scanners can be avoided automatically.

Further, according to the embodiment, the aforementioned 'pixel skipping (curtailing)' is not necessary in order to limit the amount of data handled by the interface section 10. Variation of the quantization precision of pixels (i.e. variation of the number of steps of intensity (256 steps by 8-bits, 64 steps by 6-bits, and 16 steps by 4-bits, for example)) may occur in one image by the quantization precision control according to this embodiment. However, disappearance of pixel image information by pixel skipping can be avoided, and thus deterioration of image quality and wrong colors can be prevented.

As set forth hereinabove, in the image processing device according to the present invention, the amount of data which is outputted to an external device such as a personal computer via an interface is automatically limited adequately according to the movement speed of the image processing device on the subject, without speed control by the operator and without pixel skipping, etc. Therefore, precise and relatively high quality images can be obtained constantly regardless of the movement speed of the device, without causing image contraction, disappearance of pixel image information, or wrong colors, and thus considerably faster movement of the device on the subject can be allowed if the number of steps of intensity is allowed to be smaller.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A image processing device comprising:
    an image reader for detecting the intensity of one or more colors on a subject on which the image reader moves, and outputting an electrical signal corresponding to the detected intensity;
    a quantizer for quantizing the electrical signal to a digital signal;
    a speed detector for detecting the movement speed of the image reader as it is moving on the subject; and
    a quantization precision controller for controlling quantization precision of the digital signal according to the movement speed detected by the speed detector;
    wherein the quantization precision controller outputs the most significant n bits of the digital signal with which the quantization precision controller is supplied, when the quantization precision controller sets the quantization precision at n-bits.

2. An image processing device as claimed in claim 1, wherein the quantization precision controller outputs a precision change signal when the quantization precision controller varies the quantization precision.

3. An image processing device as claimed in claim 1, wherein the image reader executes black-and-white image reading and detects the intensity of white on the subject.

4. An image processing device as claimed in claim 1, wherein the image reader executes color image reading and detects the intensity of red, green and blue of corresponding pixels on the subject.

5. A image processing device comprising:
    an image reader for detecting the intensity of one or more colors on a subject on which the image reader moves, and outputting an electrical signal corresponding to the detected intensity;
    a quantizer for quantizing the electrical signal to a digital signal;
    a speed detector for detecting the movement speed of the image reader as it is moving on the subject; and
    a quantization precision controller for controlling quantization precision of the digital signal according to the movement speed detected by the speed detector;
    wherein:
        the quantization precision controller sets the quantization precision when the movement speed detected by the speed detector is lower than a threshold value, and
        the quantization precision controller sets the quantization precision at a precision which is lower than the highest precision of the quantizer when the movement speed detector by the speed detector is not lower than the threshold value.

6. An image processing device as claimed in claim 1, wherein the speed detector includes a speed detection roller and the movement speed of the image reader on the subject is detected by rotation of the speed detection roller.

7. An image processing device as claimed in claim 1, wherein the quantization precision controller classifies the movement speed detected by the speed detector into three or more levels using two or more threshold values, and sets the quantization precision according to the classified level so that the quantization precision becomes higher as the classified level becomes lower.

8. An image processing device as claimed in claim 1, wherein the quantization precision controller outputs the most significant n bits of the digital signal with which the quantization precision controller is supplied, when the quantization precision controller sets the quantization precision at n-bits.

9. An image processing device as claimed in claim 5, wherein the quantization precision controller outputs a precision change signal when the quantization precision controller varies the quantization precision.

10. An image processing device as claimed in claim 5, wherein the image reader executes black-and-white image reading and detects the intensity of white on the subject.

11. An image processing device as claimed in claim 5, wherein the image reader executes color image reading and detects the intensity of red, green and blue of corresponding pixels on the subject.

12. A image processing device comprising:
    an image reader for detecting the intensity of one or more colors on a subject on which the image reader moves, and outputting an electrical signal corresponding to the detected intensity;
    a quantizer for quantizing the electrical signal to a digital signal;
    a speed detector for detecting the movement speed of the image reader as it is moving on the subject; and
    a quantization precision controller for controlling quantization precision of the digital signal according to the movement speed detected by the speed detector;

wherein the quantization precision controller classifies the movement speed detected by the speed detector into three or more levels using two or more threshold values, and sets the quantization precision according to the classified level so that the quantization precision becomes higher as the classified level becomes lower.

13. An image processing device as claimed in claim 12, wherein the speed detector includes a speed detection roller and the movement speed of the image reader on the subject is detected by rotation of the speed detection roller.

14. An image processing device as claimed in claim 12, wherein the quantization precision controller outputs the most significant n bits of the digital signal with which the quantization precision controller is supplied, when the quantization precision controller sets the quantization precision at n-bits.

15. An image processing device as claimed in claim 12, wherein the quantization precision controller outputs a precision change signal when the quantization precision controller varies the quantization precision.

16. An image processing device as claimed in claim 12, wherein the image reader executes black-and-white image reading and detects the intensity of white on the subject.

17. An image processing device as claimed in claim 12, wherein the image reader executes color image reading and detects the intensity of red, green and blue of corresponding pixels on the subject.

* * * * *